(12) United States Patent
McGill et al.

(10) Patent No.: US 8,196,833 B2
(45) Date of Patent: Jun. 12, 2012

(54) HYBRID SYNTHETIC BARCODE AND RFID SYSTEM AND METHOD

(76) Inventors: Randy McGill, St. Augustine, FL (US); Percy F. Shadwell, Jr., Jacksonville, FL (US)

(*) Notice: Subject to any disclaimer, the term of this patent is extended or adjusted under 35 U.S.C. 154(b) by 393 days.

(21) Appl. No.: 12/616,881

(22) Filed: Nov. 12, 2009

(65) Prior Publication Data

US 2010/0072280 A1    Mar. 25, 2010

Related U.S. Application Data

(63) Continuation-in-part of application No. 12/034,448, filed on Feb. 20, 2008, now Pat. No. 8,042,741, and a continuation-in-part of application No. 11/160,514, filed on Jun. 27, 2005, now Pat. No. 7,380,725.

(51) Int. Cl.
 *G06K 7/10* (2006.01)
(52) U.S. Cl. ............... 235/462.01; 235/462.25
(58) Field of Classification Search .......... 235/455, 235/462.01–462.25, 472.01–472.03, 491, 235/494
See application file for complete search history.

(56) References Cited

U.S. PATENT DOCUMENTS

| | | | | |
|---|---|---|---|---|
| 5,319,182 A * | 6/1994 | Havens et al. | ........... | 235/462.42 |
| 6,064,629 A * | 5/2000 | Stringer et al. | ........... | 367/128 |
| 6,611,787 B2 * | 8/2003 | Stringer et al. | ........... | 702/159 |
| 7,787,694 B2 * | 8/2010 | Fux et al. | ........... | 382/185 |
| 8,094,121 B2 * | 1/2012 | Obermeyer et al. | ........... | 345/156 |
| 2005/0162389 A1 * | 7/2005 | Obermeyer et al. | ........... | 345/161 |
| 2009/0139778 A1 * | 6/2009 | Butler et al. | ........... | 178/18.03 |
| 2011/0017818 A1 * | 1/2011 | McGill | ........... | 235/375 |

\* cited by examiner

*Primary Examiner* — Thien M Le
(74) *Attorney, Agent, or Firm* — Mark Young, PA

(57) ABSTRACT

A management system utilizes compact, reliable, adaptable, and cost effective article identifying synthetic barcode modules, which obviate printed barcodes. The modules are programmable, detect the presence of a conventional laser barcode scanner and communicate information optically in a form readable by a detected conventional laser barcode scanner. The system is compatible with network communication, allowing real-time monitoring and updating. Additionally, the system optionally includes radio frequency identification capability. An exemplary synthetic barcode module employs a single LED as a photodiode to sense the presence of a barcode scanner and as a light source to emit light that emulates light reflected from a scanned barcode. The LED enables bidirectional half-duplex optical communication.

19 Claims, 8 Drawing Sheets

Scan

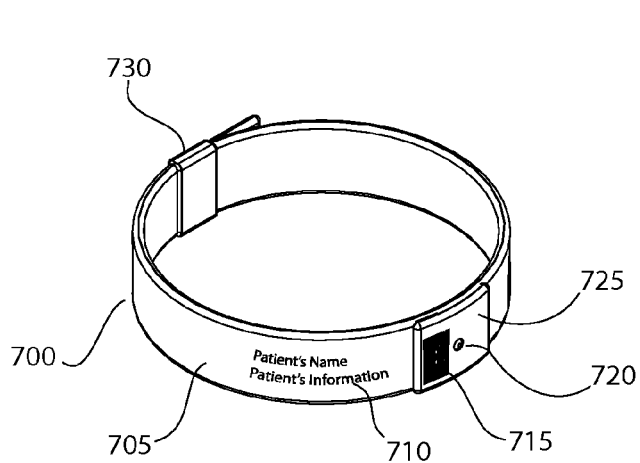
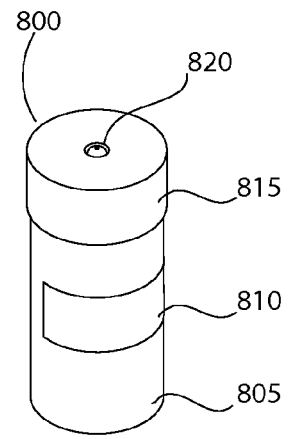
FIGURE 7
FIGURE 8
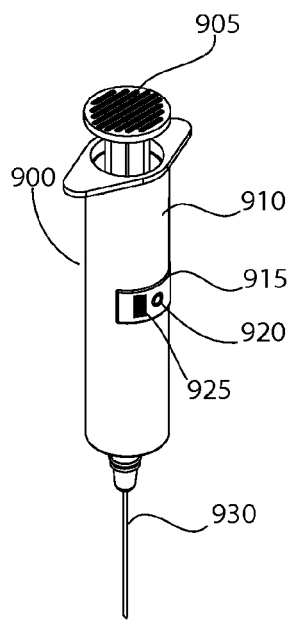
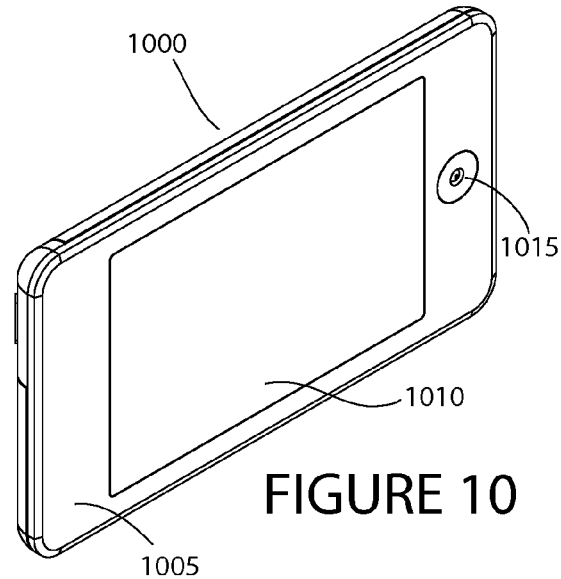
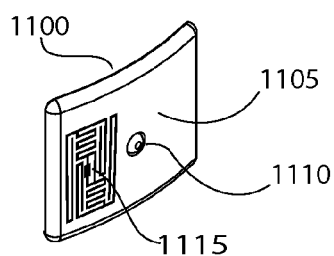
FIGURE 9
FIGURE 10
FIGURE 11

HYBRID SYNTHETIC BARCODE AND RFID SYSTEM AND METHOD

RELATED APPLICATION

This application is a continuation in part and claims the benefit of priority of pending U.S. Nonprovisional application Ser. No. 12/034,448, filed Feb. 20, 2008, which claims the benefit of priority of U.S. Nonprovisional application Ser. No. 11/160,514, filed Jun. 27, 2005, the entire contents of which are incorporated herein by this reference and made a part hereof.

FIELD OF THE INVENTION

This invention generally relates to barcodes and radio frequency identification, and more particularly, to a system and method for delivering information about a subject via optical or RF communication.

BACKGROUND

Of the many situations where articles should and can be tracked to ensure proper performance, patient therapy is one that can have dire consequences if a mistake is made. Patient therapy depends upon a series of processes linking a pharmaceutical or treatment to a patient. A serious risk to patients is human error, which can result in administering a wrong drug, dose or treatment. Such errors often result from "lapse" or "slip" mistakes in which details of a patient and/or pharmaceutical are overlooked or mistaken.

To reduce the risk of human error, barcode technology has been integrated into hospital systems. Barcode technology, already ubiquitous in the retail sector, is a widely used, stable, inexpensive means of machine-readable identification. The goal is to make a patient's medical treatment as accurate and efficient as reasonably possible.

Hospital barcode technology typically includes labeling pharmaceuticals, labeling patients (e.g., labeling each patient's wristband), using a computer system to associate prescribed pharmaceuticals with a patient, using a barcode scanner communicatively coupled to the computer system to confirm that a particular dose of a particular pharmaceutical has been prescribed to a patient before the dose of pharmaceutical is administered to the patient. Patients are given wristbands with barcode and legible identification. Pharmacies and/or drug manufacturers apply bar code technology to individual dose medication packaging. A handheld or portable device is used to perform a bedside check by capturing barcoded patient identification from the patient's wristband and barcoded information on the pharmaceutical. An interface is provided between the bedside handheld device and the hospital network. The interface may comprise a wireless communication system, either using an existing 802.11 network or using a dedicated wireless installation. In other systems, the handheld device may intermittently link (e.g., be placed in a "cradle") to transfer information via cable to the hospital network. The system may also include computerized physician order entry (POE) to provide a more structured, legible, and traceable communication between physicians, pharmacists, nurses and other hospital staff.

Problems arise when conventional barcodes are used because wristbands can become blurred and faded and be difficult to position properly for correctly reading a wide barcode. A barcode label can easily be creased or otherwise distorted when applied. Also barcode interrogation of a wristband requires "two hands"—one to hold and position the band and one to hold the reader. Barcodes on medications may be confusing because each item may contain multiple different barcodes, including those that were relevant for earlier steps in the production process, but are a distraction for the bedside check.

Other problems include system errors. For example, network communication may fail due to a weak signal, interference, a malfunctioning handheld device or access point or configuration errors. In embodiments where the handheld device must be connected to the hospital computer system, uploading problems may occur due to hardware and configuration problems. Additionally, medical staff may neglect or delay the uploading process.

Other problems relate to line of sight limitations. Barcode scanning works only when a barcode and scanner are in optical "line of sight" communication. If the barcode is concealed or not within sight of the scanner, communication is inhibited.

What is needed is an article management system that uses compact, reliable, adaptable modules that provide a cost effective alternative to conventional printed barcodes. Preferably, the system is programmable, capable of detecting the presence of a conventional laser barcode scanner and capable of communicating information in a form readable by the detected conventional laser barcode scanner. The alternative system is also preferably compatible with network communication, allowing real-time monitoring and updating. Additionally, the alternative system is preferably capable of providing an alternative means of communication that does not require a line of sight. The invention is directed to overcoming one or more of the problems and solving one or more of the needs as set forth above.

SUMMARY OF THE INVENTION

To solve one or more of the problems set forth above, in an exemplary implementation of the invention, an optical management system for articles includes a programmable synthetic barcode module. An exemplary programmable synthetic barcode module, comprises light management and controller modules. The light management module produces output signals corresponding to received light pulses, emits light pulses that emulate light reflected from a scanned barcode in scan mode, and emits light pulses that enable optical bidirectional communication in programming mode. The light management module includes an LED operating as both an optical receiver and an optical emitter. The LED receives light pulses, produces output signals corresponding to the received light pulses, and emits light pulses. The controller module receives and stores at least one code corresponding to at least one data field, receives the output signals corresponding to received light pulses, determines if the received light pulses correspond to scan mode or programming mode, and outputs driver signals to cause the light management module to emit the light pulses that emulate light reflected from a scanned barcode to communicate the code optically in scan mode, and to emit light pulses that enable optical bidirectional half-duplex communication in programming mode. The controller module determines if the received light pulses correspond to scan mode or programming mode by checking stimulus timing (e.g., by determining if the timing of received light pulses correspond to a barcode scanner or if the timing of received light pulses corresponds to a programming unit). A signal conditioning circuit operably coupled to the LED and the controller improves a signal to noise ratio and supplies a logic level signal to the controller module corresponding to light emitted from the scanner and received by the LED. The light management module includes an LED driver configured to regulate electrical power supplied to the LED.

In one embodiment, an active programmable RFID circuit is operably coupled to the controller module. The RFID circuit communicates radio frequency signals corresponding to the code stored by the controller module when the active programmable RFID circuit is interrogated by an RFID reader.

In another embodiment, an infrared emitter module is operably coupled to the controller module. The infrared emitter module periodically emits infrared optical signals corresponding to the code stored by the controller, to enable tracking using infrared sensors placed at known locations. Optionally, an accelerometer is operably coupled to the controller module. The accelerometer produces an acceleration signal when the programmable synthetic barcode module is moved. The infrared emitter module periodically emits infrared optical signals when the accelerometer produces acceleration signals.

In another embodiment, a CCD-readable display and a display controller are provided. The CCD-readable display is operably coupled to the display controller which is operably coupled to the controller module. The CCD-readable display displays indicia (e.g. alphanumeric characters, special characters, graphics, barcodes, etc. . . . ) corresponding to the code stored by the controller. In a particular embodiment, the CCD-readable display comprises an active-matrix electrophoretic display.

In another embodiment, the programmable synthetic barcode module is a key part of a system that also includes a scanner and a computer system. The synthetic barcode module is associated with an article (e.g., a wearable item such as a wristband or badge, an id card, a bed, a chart or some other tangible item). The scanner has an emitter configured to emit light, a sensor configured for receiving light and a scanner communications interface configured for communicating scan signals corresponding to the received light. The computer system has a processor, a data storage subsystem, a data communication subsystem, and a system communications interface. The computer system communicates a code corresponding to a data field to the synthetic barcode module, stores the data field on the data storage subsystem, receives scan signals from the scanner via the system communications interface, and determines if the received scan signals indicate that the scanner scanned the synthetic barcode module. As discussed above, the synthetic barcode module may optionally include an RFID circuit, a display and/or an infrared emitter. The synthetic barcode module discriminates light pulses received from a scanner from light pulses received from the bi-directional optical communications interface.

The system communications interface comprises a bi-directional optical communications interface configured to optically communicate to the synthetic barcode module optical signals representing the code corresponding to the data field. By way of example, the bi-directional optical communications interface may comprise a programming wand equipped with a light emitter and photosensor. The wand is interfaced to a computer.

An optical management method for articles according to principles of the invention includes steps of providing a programmable synthetic barcode module, receiving light from an external light source using a LED, generating a signal from the light received from the external light source using the LED, conditioning the signal from the light received from the external light source using the LED to improve signal to noise ratio, and determining if the signal corresponds to light received from a compatible device from the group consisting of a barcode scanner and an optical programming device. If the signal corresponds to light received from a compatible device (e.g., a barcode scanner or an optical programming device), then whether the signal corresponds to light received from a barcode scanner or an optical programming device is determined based upon stimulus timing. In particular, determining whether the signal corresponds to light received from a barcode scanner or from an optical programming device based upon stimulus timing may entail determining if the signal repeats at a fixed time interval. If the signal corresponds to light received from a barcode scanner, output optical signals to emit from the LED are determined and emitted from the LED. If the signal corresponds to light received from an optical programming device, bidirectional optical half-duplex communication is conducted between the optical programming device and the programmable synthetic barcode module to receive programming data on the programmable synthetic barcode module.

BRIEF DESCRIPTION OF THE DRAWINGS

The foregoing and other aspects, objects, features and advantages of the invention will become better understood with reference to the following description, appended claims, and accompanying drawings, where:

FIG. 7 provides a diagram that conceptually illustrates a bracelet equipped with an exemplary synthetic barcode and RFID module assembly according to principles of the invention; and FIG. 8 provides a diagram that conceptually illustrates a pharmaceutical container equipped with an exemplary synthetic barcode and RFID module assembly according to principles of the invention; and FIG. 9 provides a diagram that conceptually illustrates a syringe equipped with an exemplary synthetic barcode and RFID module assembly according to principles of the invention; and FIG. 10 provides a diagram that conceptually illustrates a computing device equipped with an exemplary synthetic barcode and RFID module assembly according to principles of the invention; and FIG. 11 provides a diagram that conceptually illustrates an exemplary synthetic barcode and RFID module assembly according to principles of the invention.

Figure 1:
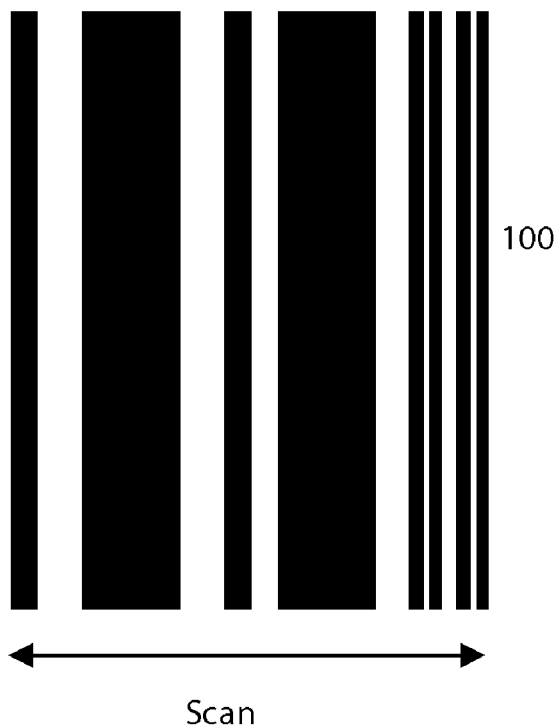
FIGS. 1 and 2 provide diagrams that conceptually illustrate principles of an exemplary synthetic barcode process according to principles of the invention.

Those skilled in the art will appreciate that the figures illustrate one or more exemplary embodiments and are not intended to be drawn to any particular scale; nor are the figures intended to illustrate every embodiment of the invention. The flowcharts illustrate exemplary processes, which may include fewer, additional or different steps, and in different orders, and yet remain within the scope of the invention. Thus, the invention is not limited to the exemplary embodiments depicted in the figures or the particular circuitry, components, applications, or ornamental aspects, steps, configurations or arrangements shown in the figures.

DETAILED DESCRIPTION

A management system that utilizes compact, reliable, adaptable, and cost effective article identifying synthetic barcode modules, which obviate printed barcodes, is provided. The system is programmable, capable of detecting the presence of a conventional laser barcode scanner and capable of communicating information in a form readable by the detected conventional laser barcode scanner. The system is compatible with network communication, allowing real-time monitoring and updating. Additionally, the system optionally includes radio frequency identification capability, providing an alternative means of communication that does not require a line of sight.

A key component of the system is a synthetic barcode module configured to detect the presence of a barcode scanner and respond by emitting light that emulates light reflected from a scanned barcode. Uniquely, an exemplary module employs a single LED as a photodiode to sense the presence of a barcode scanner and as a light source to emit light that emulates light reflected from a scanned barcode. The LED enables bidirectional half-duplex optical communication. Thus the module may be programmed optically. The module may be attached to articles being tracked as well as to associated items.

For example, in the case of a hospital barcode system, modules according to principles of the invention may be attached to drug packaging, a syringe, a patient's wrist band and a bedside chart. Light emitted from each module corresponds to codes that associate the drug with the patient, and with the room and the bed as determined by the bedside chart, and with a frequency and time of day as determined upon scanning A networked device (e.g., a computer) equipped with a module according to principles of the invention may communicate scanned data to a computer for analysis, validation and archival purposes.

Referring to the Figures, in which like parts are indicated with the same reference numerals, various views of an exemplary compact, reliable, adaptable and inexpensive system and method for communicating variable information in a form readable by a conventional laser barcode scanner are conceptually shown. Also shown are medical products, equipment and computers equipped with synthetic barcode modules and related components and/or programming. For convenience of reference, an electronic assembly that detects the presence of a laser barcode scanner using a sensor and, using that same sensor or an LED separate from the sensor, emits light pulses that emulate light reflected from a determined barcode in accordance with principles of the invention is referred to herein as a synthetic barcode module.

Advantageously, a synthetic barcode module according to principles of the invention may supply an optical signal to a conventional barcode scanner, such as laser scanners in widespread use in retail and industrial establishments. The optical signal emulates light reflected from a determined barcode, such that the decoded output from the scanner is equivalent to the decoded output that would be produced by scanning the emulated printed barcode. Consequently, standard inventory universal product code (UPC) scanning technology may be employed without an actual barcode being displayed.

In an exemplary embodiment, the synthetic barcode module is configured to emit light pulses that emulate light reflected to a barcode scanner from a scanned printed barcode, which may be any type of barcode, such as, for example, UPC, SKU, EAN, Interleaved 2 of 5, Code 93, Code 128, Code 39, or any other standardized or specially designed type of barcode or barcode symbology comprising parallel lines. A typical barcode scanner uses a scanning beam, typically narrow band light in the visible spectrum such as red laser, but potentially any bandwidth of light in the visible or infrared spectra, to pass over a sequence of nonreflecting and reflecting bars, such as dark (e.g., black) bars and light (e.g., white) spaces comprising a conventional barcode. However, the invention is not limited to use with conventional black and white visible barcodes. Instead, any alternating photon reflecting and photon absorbing materials may be utilized to provide the desired light absorption and reflecting effect. As pigments tend to appear the colors they are because they selectively reflect and absorb certain wavelengths of visible light, certain pigments selected to reflect the color of light emitted by the light source may be utilized for the reflecting regions, while pigments selected to absorb the color of light emitted by the light source may be utilized for the reflecting regions. A pigment that reflects across the entire visible wavelength range (i.e., about 380-770 nanometers) appears as white. Black surfaces absorb these wavelengths. If some regions of this light are absorbed and others reflected, then the object is colored. For example, an object that absorbs all visible light except the region 400-450 nm appears blue, while another that reflects only 650-700 nm light has a red color. As further examples, chlorophyll pigments absorb blue and red light but transmit green accounting for the color of leaves. Carotenoid pigments absorb violet and blue but transmit yellow, orange, and red, accounting for the bright orange color of carrots and apricots, which are rich in carotene.

In one embodiment, the synthetic barcode module is configured to emit light pulses that emulate light reflected to a UV barcode scanner from a scanned barcode comprising an ultraviolet (UV) ink. UV ink may be used to mark a substrate with identifying barcode indicia. A benefit of using UV ink is that it is typically not visible when illuminated with light in the visible spectrum (380-770 nm), but is visible when illuminated with light in the UV spectrum (200-380 nm). A UV barcode reader may be used to sense light reflected from the UV ink. As the UV ink is typically not visible when illuminated with light in the visible spectrum (380-770 nm), the presence and location of the barcode may only be known to initiated personnel and properly configured equipment. In this embodiment, the synthetic barcode module emits UV light pulses that are not visible and emulate light reflected to a UV barcode scanner from a scanned barcode comprising an ultraviolet (UV) ink.

In one embodiment, the synthetic barcode module is configured to emit light pulses that emulate light reflected to an IR barcode scanner from a scanned barcode comprising an ultraviolet (IR) ink. IR ink may be used to mark a substrate with identifying barcode indicia. A benefit of using IR ink is that it is typically not visible when illuminated with light in the visible spectrum (380-770 nm), but is visible when illuminated with light in the IR spectrum (800-1600 nm). An IR barcode reader may be used to sense light reflected from the IR ink. As the IR ink is typically not visible when illuminated with light in the visible spectrum (380-770 nm), the presence and location of the barcode may only be known to initiated personnel and properly configured equipment. In this embodiment, the synthetic barcode module emits IR light pulses that are not visible and emulate light reflected to an IR barcode scanner from a scanned barcode comprising an ultraviolet (IR) ink.

Figure 2:
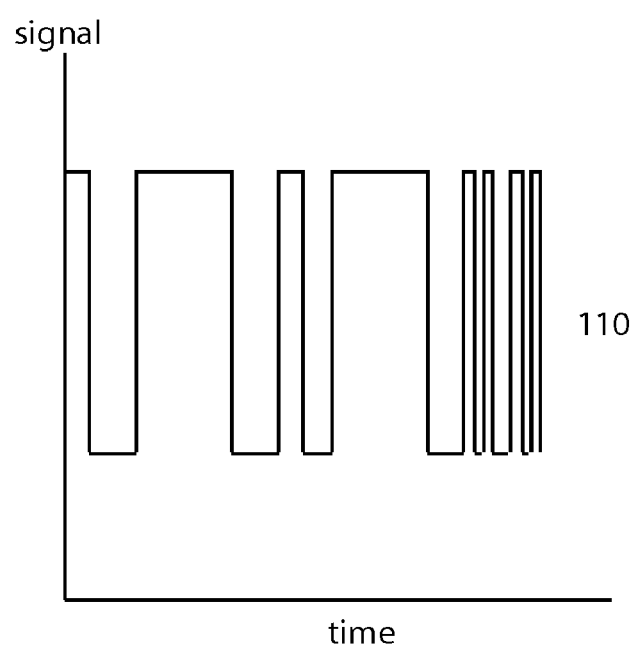

Scanning may progress sequentially left to right and/or right to left. As the beam of light scans across a barcode, such as the barcode 100 shown in FIG. 1, the beam is at least partially reflected back to the scanner by the spaces and at least partially absorbed by the bars. A receiver, such as a photocell detector, in the barcode scanner receives the reflected beam and converts it into an electrical signal. As the beam scans across the barcode, the scanner typically creates one electrical signal for the spaces where the beam is reflected, and a different electrical signal for the bars where the beam is absorbed. This process is conceptually illustrated by the signal stream 110 in FIG. 2. The scanning speed and the width of each space and bar determine the duration of each electrical signal. The signals (including its duration) are decoded by the scanner or by an external processor into characters that the barcode represents.

Figure 3:
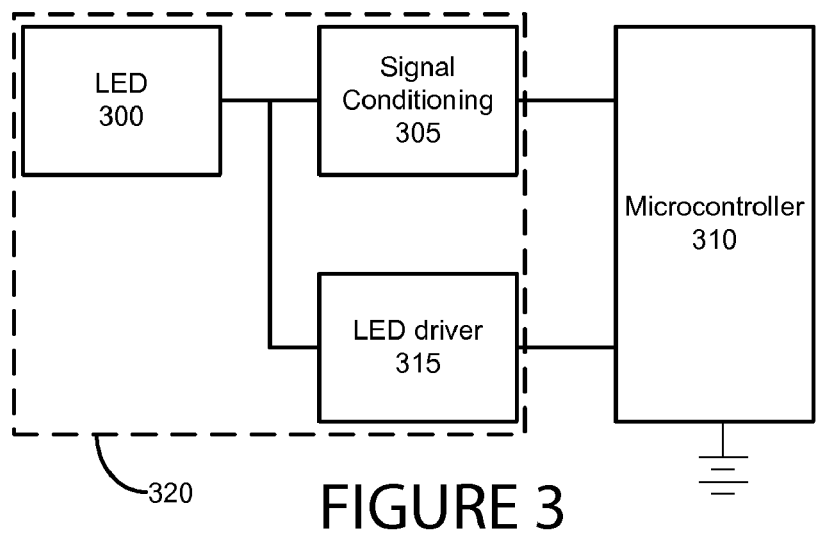
FIG. 3 provides a high level block diagram of components of an exemplary embodiment of a synthetic barcode module assembly according to principles of the invention.

As conceptually illustrated in FIG. 3, a first embodiment of an exemplary synthetic barcode scanning module comprises an assembly that is intended to be the target of the standard inventory barcode scanners, such as those used by retailers. An LED 300 serves as both an optical sensor (i.e., photodiode) and light source. The LED 300 may be very small. The LED 300 will generate an electrical signal upon exposure to the direct laser scanning beam. In a preferred embodiment, the LED is configured to operate in "short circuit mode" and generate a current (e.g., a current measured in μA) in response to incident light. While an LED is generally not an efficient photocell, in the presence of a laser scanner, an LED will produce a sensible signal, e.g., enough microamps at enough volts to operate an amplifier or logic gate. As a photodiode, the LED is sensitive to wavelengths equal to or shorter than the predominant wavelength it emits. A HeNe laser found in older laser barcode scanners and a laser diode used in modern barcode scanners have an operation wavelength (λ) of about 630 to 650 nm, in the red portion of the visible spectrum. Thus, for example, a Super High Brightness Red LED, which emits pure red to He—Ne laser red light, with a peak wavelength (λ) between 650 and 670 nm, will be sensitive to red light from a laser barcode scanner. Similarly, an infrared LED may be used to sense light emitted form and emulate light reflected to an IR barcode scanner. The LED can be multiplexed, such that it can be used for both light emission and sensing at different times. As both an emitter and detector of light, the single LED can be used to achieve bidirectional communications with another device. Operating as a half-duplex transceiver, the LED enables optical programming of a module according to principles of the invention. Although one LED 300 is shown in FIG. 3, those skilled in the art will appreciate that a plurality of LEDs 300 may be utilized, at least one of which serves as both a light emitter and a sensor, within the scope of the invention.

A signal conditioning circuit or device 305 (i.e., "signal conditioner") improves the signal to noise ratio from the LED 300 and supplies logic level signals to a microcontroller 310 when a scanning laser is observed by the LED 300. The signal conditioning circuitry is configured to receive input from the LED and detect (e.g., filter) a weak signal (e.g., a few microamps) generated by the LED 300, discriminate the laser pulse form from that of other light sources (e.g., due to voltage rise time), and then adjust the signal voltage to the input level required by the microcontroller 310. Signal conditioning entails processing input analog signals from the LED 300 and generating output signals (e.g., digital logic level signals) to meet the requirements of the microcontroller 310 for further processing. The signal conditioning may include amplification, filtering, converting, range matching, isolation and any other processes required to make output from the LED 300 suitable for processing by the microcontroller 310 after conditioning. Filtering separates noise from the portion of the signal frequency spectrum that contains valid data. Amplification increases the resolution of the inputted signal, and increases its signal-to-noise ratio. Optionally, signal isolation may be used to isolate possible sources of signal perturbations and protect the microcontroller. The signal conditioning circuit may also include an analog-to-digital converter (ADC) configured to convert the input analog current to digital logic level signals representative of the magnitude of the input current. The signal conditioning circuit 305 has a high enough input impedance that it is not affected by the drive voltage delivered to the LED 300 by the LED driver 315.

In an exemplary embodiment, the signal conditioning circuit 305 uses amplification and a high pass filter to discriminate a laser pulse form from that of other light sources based upon signal amplitude and rise time. Illustratively, the signal conditioning circuit 305 may be configured to handle as a laser pulse any signal with an amplitude and rise time of about $(0.1 \text{ mW/mm}^2)/100$ μs, or a greater amplitude or a quicker rise time. Skilled artisans will appreciate that for a given LED, tests may be performed using a variety of ambient and laser light sources to determine a workable amplitude and rise time for discriminating a laser pulse form from that of other light sources.

The microcontroller 310 is a programmable integrated circuit comprised of a CPU with support features, such as an oscillator, timer, watchdog, and serial and analog I/O. Program memory, such as memory in the form of flash or ROM is included as well as a some RAM. The microcontroller 310 is configured to respond to signals from the signal conditioning circuit 305. The microcontroller 310 receives conditioned signals via the signal conditioning circuit 305. The microcontroller 310 may include an analog to digital converter (ADC) to convert input analog voltage (or current) continuous signals to discrete digital data. The microcontroller 310 may also include a digital-to-analog converter (DAC) to perform the reverse operation for output signals. The microcontroller 310 is programmed to cause the LED driver to energize the LED and transmit light pulses in a fashion to simulate the reflections from printed barcodes using the EAN-13, UPC-A, or other standard barcode systems, so that the emitted pulses can be read using a conventional barcode reader. The microcontroller 310 may be comprised of any suitable controlling device, such as a logic circuit, a microprocessor, a combination of these elements, and the like.

The microcontroller 310 may have an internal clock oscillator as the time base for all operations. Alternatively, a crystal and associated circuitry may be utilized for a timing base. It may also have internal memory, which may store programming for the module and a table that determines the time and duration the LED 300 must be illuminated in order to generate light pulses comprising the synthetic barcode signal. Timing data for barcode synthesis may reside in the microcontroller 310 from manufacture or may be downloaded at some later point through any type of communications medium, e.g. RS232, RF data link, optical data link, etc.

The microcontroller 310 sends control signals to the LED driver 315 to make the LED 300 turn on and off with sufficient brightness, and at the correct timing, for the emitted light to be interpreted by a standard laser barcode scanner as the signal from a printed barcode. By way of example and not limitation, the microcontroller 310 may modulate the light emission period by sending control signals to the LED driver 315.

In an exemplary embodiment, the microcontroller 310 causes the LED driver 315 to cause the LED 300 to emit light and cease emission for determined periods of time, according to a determined symbology. The specification of a symbology includes the encoding of the single digits/characters of the message as well as the start and stop markers into bars and space, the size of the quiet zone required to be before and after the barcode as well as the computation of a checksum. Illustratively, x millisecond periods (representing white spaces between bars) during which light is emitted and y millisecond periods (representing black bars) during which no light is emitted may be utilized to emulate light reflected from a barcode. The variable x may vary from a few milliseconds (e.g., 2 or 4 milliseconds) to multiples of that amount (e.g., 1, 2, 3 or 4 times that amount), depending upon the width of the space represented. Likewise, y may vary from a few milliseconds (e.g., 2 or 4 milliseconds) to multiples of that amount (e.g., 1, 2, 3 or 4) times that amount, depending upon the width of the bar represented. The timing works well across a wide range of barcode scanners. The barcode scanner interprets the emitted light as an analog signal waveform of more or less rectangular-shaped pulses.

The LED 300 is a current-driven device whose brightness is proportional to its forward current. Forward current can be controlled either by applying a voltage source and using a ballast resistor or, preferably, by regulating LED current with a constant-current source, such as an LED driver 315. The LED driver 315 supplies a correct amount of current to drive the LED 300. While a separate LED driver 315 is shown, the LED driver 315 could optionally be included or integrated into the microcontroller 310. The LED driver 315 eliminates changes in current due to variations in forward voltage, which translates into a constant LED brightness. Optionally, the LED driver 315 may enable Pulse Wave Modulation (PWM) dimming, which entails applying full current to the LED at a reduced duty cycle and at a high enough frequency (e.g., >100 Hz) to avoid pulsing that is visible to the human eye. In some embodiments, the LED driver 315 may be comprised of one or more pins on the microcontroller 310 with a current limiting resistor. A switched current source or current sink may also be used to drive the LED 300.

In operation when a laser barcode scanner hits the LED 300, the signal conditioning circuit 305 communicates filtered and amplified signals to the microcontroller 310, which causes the LED driver 315 to drive the LED 300 in a manner that emits a predefined series of light flashes corresponding to light reflected to a scanner upon scanning a barcode. When that series of light flashes has been sent, the system module waits for another hit from a scanning laser beam to repeat the process. The timing of the transmitted light pulses may be preprogrammed in the microcontroller 310.

The module may be reprogrammable. The microcontroller 310 may be programmed to send out different sets of codes on successive laser hits as a means of sending a larger volume of information. The microcontroller 310 may also be programmed to send out different sets of codes on successive laser hits to communicate various sets of information. The codes may be configured to communicate any ASCII character or special code symbol. The microcontroller 310 may be designed to accept new instructions and programming through the LED 300 and signal conditioning means 305. Using an optical communication protocol, the microcontroller 310 could be programmed to replace existing instructions with new data received through this optical input path. By way of example and not limitation, an optical programmer such as the device described below with reference to FIGS. 14 and 15 may be utilized. This makes the module easily reconfigured for new information. Additionally, the microcontroller 310 may be configured to accept new instructions and programming through electrical contacts or by an inductive pickup coil. A protocol may allow the microcontroller 310 to replace existing instructions with new data received through this path. Thus, the module can easily be reconfigured to emulate a different barcode. For example, the system may be configured and reconfigured, programmed and re-programmed, to emulate many different barcodes. Any and all of the signal conditioning, microcontroller and LED driver functionality described above could be included in the microcontroller of a system of broader functionality and purpose.

In another embodiment, the microcontroller 310 may be programmed to send out a reference code as a means of revealing a large volume of information. By way of example and not limitation, the microcontroller 310 may cause the LED 300 to emit a multi-digit code (e.g., a normal 13 digit code) which may reference huge amounts of data available through a secure network. Illustratively, upon scanning the device, vast amounts of data including photographs and other anthropometric data could be retrieved from one or more data sources using the multi-digit code. In a security implementation, for example, a wearer's photograph may instantly appear on a security person's terminal. In sum, the amount of data referenced is not limited to what can be stored and transmitted from a synthetic barcode device according to principles of the invention.

The synthetic barcode module sequentially communicates barcode data via a communication path (e.g., optical communication path). Thus, barcode data corresponding to various items of information may be communicated via an optical communication path using the synthetic barcode module.

Figure 4:
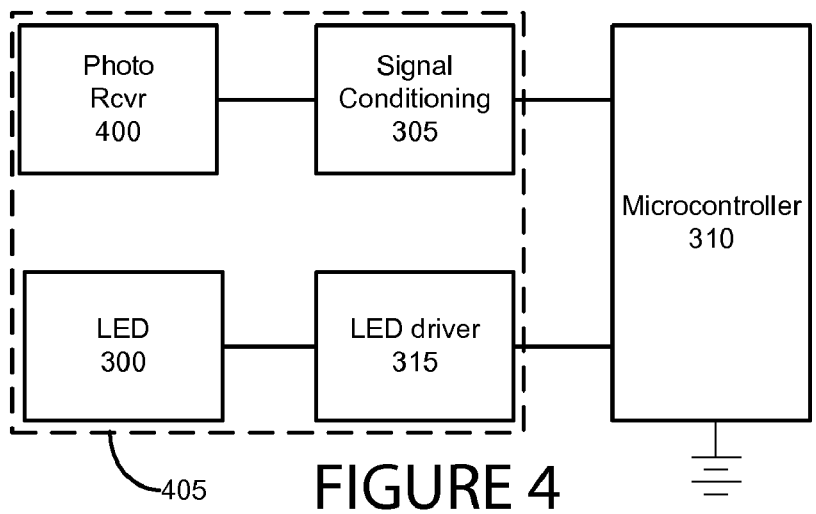
FIG. 4 provides a high level block diagram of components of another exemplary embodiment of a synthetic barcode module assembly according to principles of the invention.

Although one dual function LED 300 is shown in FIG. 3, those skilled in the art will appreciate that a plurality of LEDs 300 may be utilized, at least one of which is configured to serve as a sensor. Alternatively, as shown in FIG. 4, a separate photo receiver 400 may be utilized. The photo receiver 400 may be comprised of any compatible photo detector capable of sensing electromagnetic energy in the visible and/or infrared parts of the spectrum, as emitted by a barcode scanner. Nonlimiting examples of suitable photo receivers include photoresistors which change resistance according to light intensity, photovoltaic cells which produce a voltage and supply an electric current when illuminated, photodiodes which can operate in photovoltaic mode or photoconductive mode converting light into either current or voltage, and phototransistors incorporating one of the above sensing methods.

The photo receiver 400, which is dedicated to sensing light emitted from a barcode scanner, may be responsive to wide range of wavelengths of light. Illustratively, photodiodes are available for visible through infrared wavelengths. A silicon photodiode may provide a spectral response from wavelengths of 190 to 1100 nm, while a germanium photodiode may offer a spectral response from 400 to 1700 nm and an Indium gallium arsenide photodiode may provides a spectral response from about 800 to 2600 nm.

Each embodiment shown in FIGS. 3 and 4 includes a synthetic barcode circuit 320, 405 operably coupled to a microcontroller 310. The LED 300 of the synthetic barcode circuit 320 of the embodiment shown in FIG. 3 is operably coupled to both the signal conditioning circuit 305 and LED driver 315. In that embodiment, the LED 300 functions as both an emitter and a photodiode. The synthetic barcode circuit 405 of the embodiment shown in FIG. 4 includes the LED 300 operably coupled to the LED driver 315 and a photo receiver 400 operably coupled to the signal conditioning circuit 305. In that embodiment, the LED 300 functions only as an emitter and the photo receiver 400 functions as an optical-to-electrical transducer. Thus, the difference between the two embodiments is that the photo receiver 400 is configured to sense optical input in the synthetic barcode circuit 405 of the embodiment shown in FIG. 4, while the LED 300 performs both sensing and emission in the synthetic barcode circuit 320 of the embodiment shown in FIG. 3.

Figure 5:
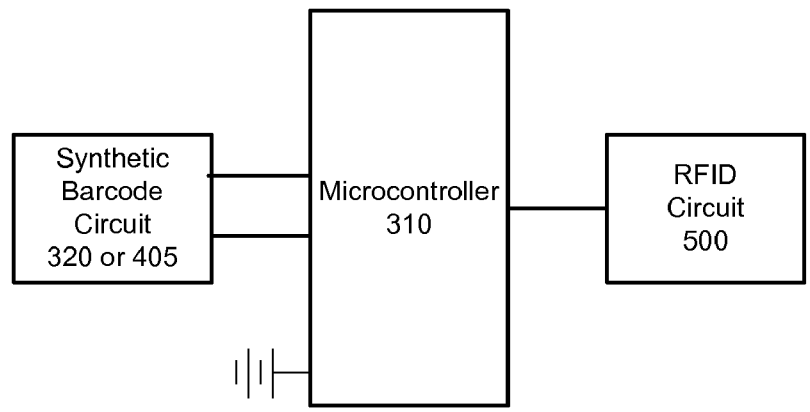
FIG. 5 provides a high level block diagram of components of an exemplary embodiment of a synthetic barcode and RFID module assembly according to principles of the invention.

Referring now to FIG. 5, another embodiment of an exemplary synthetic barcode scanning module further comprises an RFID circuit 500. The RFID circuit 500 is an active device that includes an RFID tag comprised of a microprocessor, integrated circuit for storing and processing information, modulating and demodulating a radio-frequency (RF) signal, and a serial communication physical interface (e.g., serial port) through which information transfers to and from the microcontroller 310. The RFID tag also includes an antenna for receiving and transmitting the signal. The active RFID device uses battery power to transmit signals autonomously. The RFID circuit is communicatively coupled to the microcontroller 310, allowing stored data to be updated. The RFID circuit 500 communicates data wirelessly when interrogated by an RFID reader. The microcontroller 310 controls the data communicated via the RFID circuit 500.

When equipped with an RFID circuit 500 as illustrated in FIG. 5, the exemplary synthetic barcode scanning module is capable of communicating with both barcode scanners and RFID readers. Data defining the actual RFID output signal is supplied to the microprocessor of the RFID circuit 500 by the microcontroller 310. Advantageously, such a module may optically communicate an RFID data stream to a barcode scanner, communicate an RFID data stream in conventional manner to an RFID reader, communicate barcode data via RF to an RFID reader, and optically communicate bar code data to a barcode scanner. Additionally, the microcontroller 310 in concert with the RFID circuit 500 allows the RFID circuit 500 to communicate variable information, e.g., information that changes with time or with other conditions. Periodically, the microcontroller 310 may be updated with additional data or reprogrammed. In such case, the microcontroller 310 in concert with the RFID circuit 500 allows the RFID circuit 500 to communicate different or additional information as reprogrammed or updated.

Advantageously, the embodiments illustrated in FIGS. 3, 4 and 5 can be extremely compact, built only slightly larger than an LED and RFID circuit with the use of die components and a small battery. As another advantage, these embodiments would consume very little battery energy until interrogated by a laser scanner or RFID reader. With a low duty cycle, a good battery could be expected to last a considerable time (e.g., possibly years).

Figure 16:
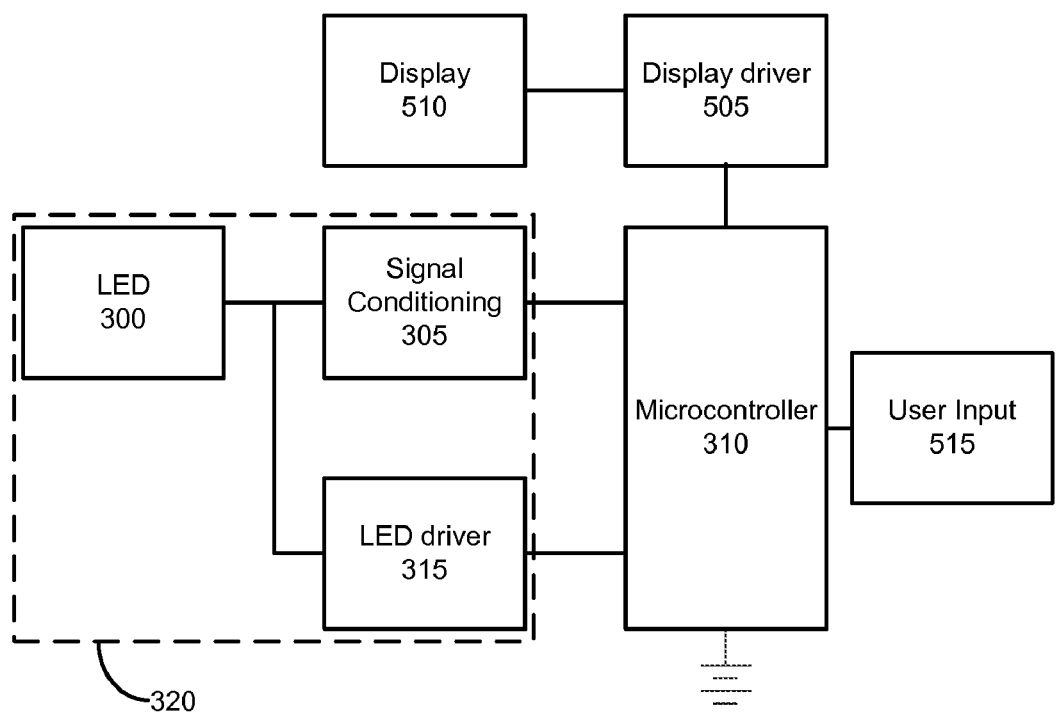
FIG. 16 provides a high level block diagram of components of an exemplary embodiment of a synthetic barcode module assembly according to principles of the invention.

In an another embodiment, the synthetic barcode module includes an display 510 (e.g., active matrix display) that is readable by a human and/or a CCD scanner ("CCD-readable"), as shown in FIG. 16. The display may be rigid or flexible. The display is coupled to a compatible display controller 505, which in turn is coupled to the microcontroller 310. A non-limiting example of a suitable display controller 505 is the Seiko Epson Corp and E Ink Corp S1D13521B (electronic-paper-display)-controller IC. Optionally, a switch 515 may be provided to activate, deactivate and control the display. In a particular exemplary embodiment, the display 510 is an active-matrix electrophoretic display. Advantageously, such displays use reflected light instead of backlight. Additionally, such displays do not require periodic raster scans of the entire display to maintain and change a displayed image. Rather, such displays can display an image even with no power connected to it. The controller sends electronic signals only to pixels that require change.

In operation, the display 510 may continuously display one or more barcodes and/or alphanumeric information. Using the optional switch 515 (e.g., a small push button), a user may instruct the microcontroller 310 to activate or deactivate the display 510, or cause the display 510 to display additional or different information.

Figure 17:
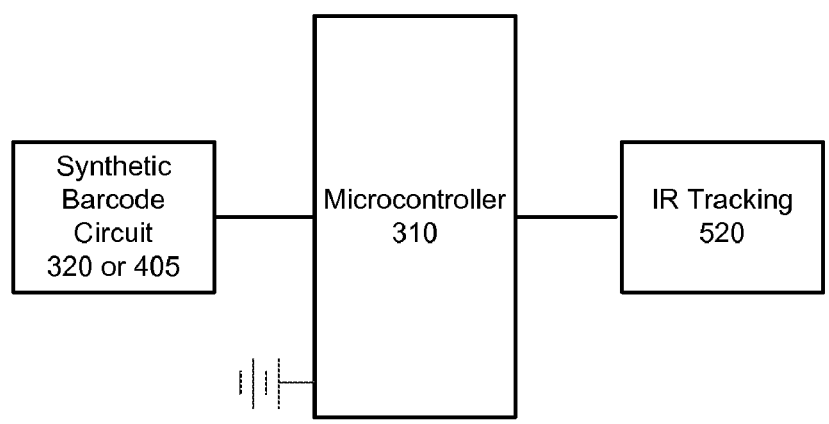
FIG. 17 provides a high level block diagram of components of an exemplary embodiment of a synthetic barcode module assembly according to principles of the invention.

Referring now to FIG. 17, another embodiment of the synthetic barcode module includes an IR tracking module 520 equipped with an IR emitter configured to emit unique IR signals, i.e. identifier (ID) code at regular intervals. The microcontroller 310 controls the signals emitted. Infrared sensors placed throughout a building, such as wall or ceiling, receives those ID code signals, which are then communicated to location software. Positions of the placed infrared sensors are known before determining the synthetic barcode module location. The location of the synthetic barcode module is thus determined by proximity to the sensors receiving the ID code signals. The advantage of IR technology is that IR emitters have the ability to produce signals using relatively little power. Reflections of the emitted signal allow the IR tracking module 520 to work, even when the emitted signal is not directly aimed at the sensor. Emitted ID code signals may also be used to provide access to certain locations and objects. By way of example, a door lock may be connected to and controlled by an actuator. The actuator may be triggered by an IR receiver controlled in response to ID code signals received from the IR tracking module 520.

As another option, the IR tracking module 520 may include a motion sensor (e.g., a micromachined accelerometer). The motion sensor 520 detects movement of the synthetic barcode module. When movement corresponding to patient transport is detected, the motion sensor activates the IR emitter of the IR tracking module 520. Such an embodiment conserves battery power until triggering motion is detected.

Those skilled in the art will appreciate that a synthetic barcode system and method according to principles of the invention may be utilized in many different industries and applications. By way of example and not limitation a synthetic barcode module according to principles of the invention, because of its compact configuration, may be applied to a wearable item such as a bracelet, incorporated into a personal identification card that can be worn or held by a person, a container for pharmaceuticals, such as a syringe or medicine bottle, a computing device, a patient's bed, or any other portable, mobile, or fixed object that may be scanned or read. Personal identification data, medical history data, and other information could be encrypted in the synthetic barcode module and then transmitted to an inexpensive barcode scanner and/or an RFID reader.

An inherent advantage is that the primary readout technology (i.e., a barcode scanner) is ubiquitous and inexpensive, and use of the supplemental readout technology (i.e., RFID reader) is growing. Another advantage is that the encoded information is private, communicated optically and/or via RF, and not legible to a human. Yet another advantage is that the data may be updated and replaced using bi-directional half-duplex communication capabilities of the module. Still another advantage is that vast amounts of data may be encoded in the module. Furthermore, because of its compact configuration, a synthetic barcode module may be applied to a wide range of objects without comprising their utility. Moreover, the total cost of ownership of such modules can be relatively low, comparable to that of RFID tags, because the hardware components (e.g., an LED, a signal conditioner, a microcontroller and an LED driver) are all inexpensive and widely available.

A longer range version may be used to identify persons, or objects, at a distance. A computer system could automatically keep track of who is present at a particular locale, or who or what has passed through a laser scanned or RFID reading check point. The effective distance may be increased by increasing sensitivity in detecting a scanner and also by increasing LED and/or RFID output.

Figure 6:
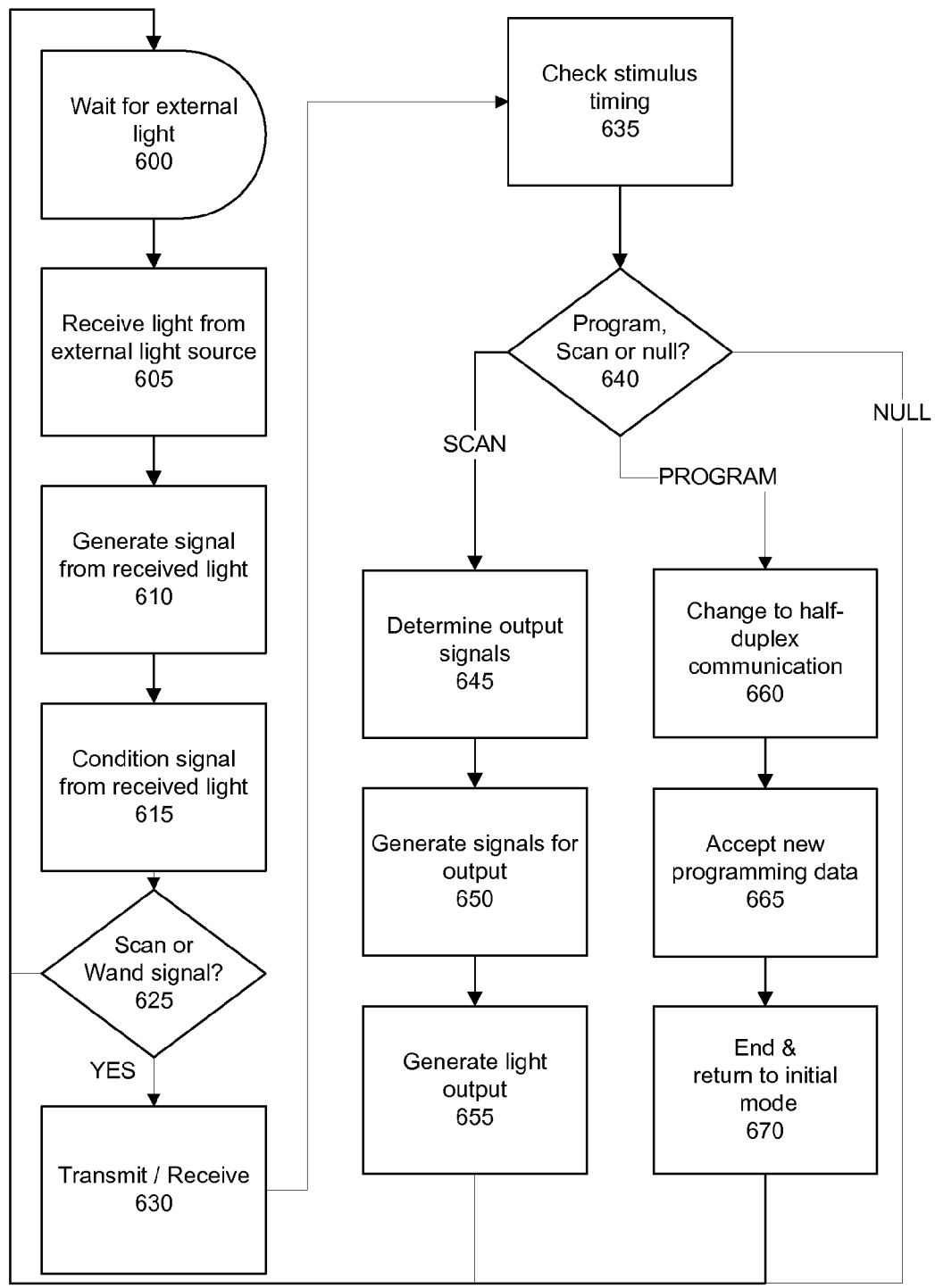
FIG. 6 provides a high level flowchart of steps of an exemplary synthetic barcode detection and response method according to principles of the invention.

Referring now to FIG. 6, a high level flowchart of steps of an exemplary synthetic barcode method according to principles of the invention is conceptually shown. The method entails waiting to receive light from an external source, as in step 600. To conserve power, a system implementing the method may sit idle until light is received, i.e., until interrogated. Light is received from an external source, which may include laser light emanating from a barcode reader or light emitted from other nearby light sources, as in step 605. The light may be collected by a light transmission means such as a light pipe, lens or mirror, and then transmitted to an optical sensor, which may be an LED used also as an emitter or may be a separate photo receiver. Next, the sensor generates a signal corresponding to the received light, as in step 610. A signal conditioner receives and conditions the signal from the sensor by improving the signal to noise ratio and supplying logic level signals to a microcontroller, as in step 615.

The system discriminates among a programming signal (e.g., wand signal), a scanning signal and a signal from another source of light. First, the system is configured to discriminate a signal corresponding to a laser pulse of a barcode reader or programming device (e.g., programming wand) from signals generated by other light sources, such as ambient light, based upon signal characteristics, such as stimulus timing or voltage rise time, as in step 625. If the signal corresponds to neither a signal from a programming unit nor a signal from a scanner, then control returns to step 600. However, if a signal corresponds to either a signal from a programming unit or a signal from a scanner, then steps 630-640 are performed to further discriminate between a signal from a programming unit and a signal from a scanner. In step 635, stimulus timing is checked. That entails determining if the signal being received has a regular pulse rate or a determined programming rate. For example, laser scanners scan a laser beam back and forth across a bar code. The scanning rate is typically fixed at about 100 scans per second (or more) for a particular laser scanner. To the system, the scanning laser of a barcode scanner will appear as a light pulse recurring in regular fixed intervals of time (e.g., once every 0.01 seconds). Thus, light from a barcode scanner may be readily distinguished by determining if the light pulse is repeatedly detected at a fixed frequency (i.e., at a fixed amount of time between detected light pulses).

In contrast, a programming unit according to principles of the invention emits (i.e., is configured to emit) light pulses in a distinctive manner (i.e., pulses at a variable frequency) to differentiate the programming unit from a barcode scanner. By way of example and not limitation, the programming unit may emit light pulses at varying frequencies, e.g., at a first frequency, followed by a second frequency and then a third frequency. The programming unit may be configured to emit light at any variable frequency that is not mistaken for a barcode scanner.

Based upon the stimulus timing, such as pulse rates or frequencies, detected in step 635, a determination is made if the emitting unit is a barcode scanner or a programming unit as in step 640. For a scanner, control proceeds to scanning mode steps 645-655. The time at which scanning mode begins and/or ends may be recorded and stored by the synthetic barcode module. In scan mode, the received light prompts the system to emit output optical and/or RFID for a scanner/reader to read. For a programming unit, control proceeds to bidirectional communication mode (i.e., programming mode) steps 660-670. The time at which programming mode begins and/or ends may be recorded and stored by the synthetic barcode module. In programming mode, the received light prompts the system to receive programming. If the signal corresponds to neither a signal from a programming unit nor a signal from a scanner, then in "null mode" control returns to step 600. Null mode may be triggered due to an incompatible laser light source. Thus, unless and until signal characteristics correspond to a defined mode, the module will neither communicate data nor accept new programming.

Because the times at which scanning and/or programming modes begin and/or end may be recorded and stored by the synthetic barcode module, auditing and checking may be performed. For example, in a patient-hospital setting, if interrogation of a synthetic barcode module reveals that a scan of the patient occurred a few minutes earlier, the earlier scan may indicate that a nurse already administered prescribed medicine.

In scan mode, a programmed microcontroller receives the conditioned signals and determines output signal stream(s), as in step 645. An LED driver receives the signals that are output from the microcontroller and supplies a correct amount and timing of drive current to an LED light source to emulate light reflected from a determined scanned barcode, as in step 650. The LED light source receives the drive current from the LED driver and emits light to emulate light reflected from a determined scanned barcode, as in step 655. Advantageously, in a particular exemplary embodiment of the invention, the device that emits the light in step 630 may be an LED and the same device (i.e., same LED) used to sense the light and generate a signal from the received light in step 605-610. As another advantage, in another particular exemplary embodiment, one or more light pipes may facilitate the capture (i.e., receipt) and transmission of light from an external source, as in step 605.

In program mode, a programmed microcontroller receives the conditioned signals and commences half-duplex bidirectional communication according to a determined protocol to enable the optical exchange of data, as in step 660. To transmit, the LED driver receives the signals that are output from the microcontroller and supplies a correct amount and timing of drive current to produce an optical signal stream. In an exemplary embodiment, data communications operate in half-duplex mode because, while transmitting, the LED cannot also receive. While full-duplex communication may not be feasible in such an embodiment, the synthetic barcode module and programming unit may simulate or approximate full duplex communication by quickly turning the link around. New programming and updates may be accepted by the microcontroller, as in step 665. At the end of the programming cycle in step 670, an end signal stream is received and control returns to step 600.

In another embodiment, RFID reader signals may be sensed and RFID output signals may be communicated from the module. The RFID output may correspond to the synthetic barcode data.

Referring now to FIGS. 7 through 11, a synthetic barcode module is shown alone and applied to or integrated with a variety of articles in accordance with the principles of the invention. An exemplary article is a wearable item, such as a wrist band 700 with a wrist strap 705, adjustable fastener 730 and optional printed information (e.g., a patient's name) 710. The synthetic barcode module comprises a housing 725 that contains a synthetic barcode circuit 320 (as described above). The synthetic barcode circuit 320 includes an LED 720 either as an emitter working in conjunction with a photo receiver or as a dual function emitter and photodiode configured to both emit and sense light. Optionally an RFID circuit 500 may also be included. The RFID circuit 500 includes an RFID tag 715 and antenna for receiving and transmitting RFID signals.

Another exemplary article is a container, such as a medical device or drug container 800 with a housing 805, a removable cap 815, and a conventional label 810. The synthetic barcode module may comprise a separate housing that is attached to the container 800 or may be integrated in the container 800 such as in the cap of the container. The module includes a synthetic barcode circuit 320 with an LED 820 either as an emitter working in conjunction with a photo receiver or as a dual function emitter and photodiode configured to both emit and sense light. Optionally an RFID circuit 500 may also be included.

Another exemplary article is a drug delivery device, such as a syringe 900 with a plunger 905, body 910, and needle 930. The synthetic barcode module may comprise a separate housing 915 that is attached to or integrated with the body 910. The synthetic barcode module comprises a housing 915 that contains a synthetic barcode circuit 320 (as described above). The synthetic barcode circuit 320 includes an LED 920 either as an emitter working in conjunction with a photo receiver or as a dual function emitter and photodiode configured to both emit and sense light. Optionally an RFID circuit 500 may also be included. The RFID circuit 500 includes an RFID tag 915 and antenna for receiving and transmitting RFID signals.

Another exemplary article is a computing device, such as a handheld computing device, laptop computer or computing tablet 1000 which may be configured to provide a wide array of computing functions, including data input/output, audio, display, data processing, and wired and wireless communication. The synthetic barcode module may comprise a separate housing that is attached to or integrated with the body 1005 of the device 1000. The synthetic barcode module contains a synthetic barcode circuit 320 (as described above). The synthetic barcode circuit 320 includes an LED 1015 either as an emitter working in conjunction with a photo receiver or as a dual function emitter and photodiode configured to both emit and sense light. Optionally an RFID circuit 500 may also be included.

Referring now to FIG. 11, a synthetic barcode module 1100 is shown alone. The module may be attached to any suitable article using adhesive, mechanical fastening, or other suitable attachment means. The module may be applied to or integrated with a variety of articles in accordance with the principles of the invention. The synthetic barcode module 1100 comprises a housing 1105 that contains a synthetic barcode circuit 320 (as described above). The synthetic barcode circuit 320 includes an LED 1110 either as an emitter working in conjunction with a photo receiver or as a dual function emitter and photodiode configured to both emit and sense light. Optionally an RFID circuit 500 may also be included. The RFID circuit 500 includes an RFID tag 1115 and antenna for receiving and transmitting RFID signals.

Figure 14:
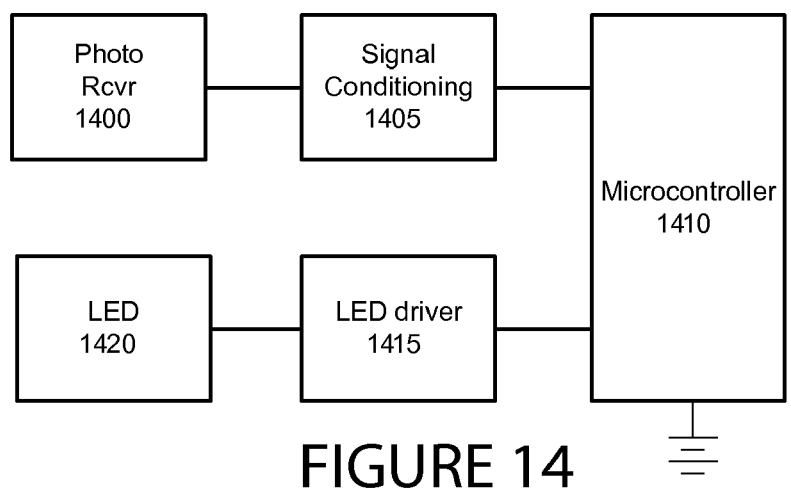
FIG. 14 provides a high level block diagram of components of an exemplary programming module according to principles of the invention.

As conceptually illustrated in FIG. 14, a first embodiment of an exemplary synthetic barcode programming module comprises an assembly that is intended to initiate and engage in bidirectional half-duplex communication with a synthetic barcode module according to principles of the invention. A photo receiver 1400 such as a photodiode functions as an optical-to-electrical transducer. An LED 1420 emits light. The photoreceiver 1400 and LED 1420 may be very small. A signal conditioning circuit or device 1405 (i.e., "signal conditioner") improves the signal to noise ratio from the photoreceiver 1400 and supplies logic level signals to a microcontroller 1410 when input light is observed by the photoreceiver 1400. The signal conditioning circuitry is configured to receive input from the photoreceiver 1400, process input analog signals and generating output signals (e.g., digital logic level signals) to meet the requirements of the microcontroller 1410 for further processing. The signal conditioning may include amplification, filtering, converting, range matching, isolation and any other processes required to make output from the photoreceiver 1400 suitable for processing by the microcontroller 1410 after conditioning.

The microcontroller 1410 is a programmable integrated circuit comprised of a CPU with support features, such as an oscillator, timer, watchdog, and serial and analog I/O. Program memory, such as memory in the form of flash or ROM is included as well as a some RAM. The microcontroller 1410 is configured to respond to signals from the signal conditioning circuit 1405. The microcontroller 1410 may include an analog to digital converter (ADC) to convert input analog voltage (or current) continuous signals to discrete digital data. The microcontroller 1410 may also include a digital-to-analog converter (DAC) to perform the reverse operation for output signals. The microcontroller 1410 may also include (or be operably coupled to) an i/o interface (e.g., a USB interface) configured to enable communication with a compatible device (e.g., a computing device). The microcontroller 1410 is programmed to cause the LED driver 1415 to energize the LED 1420 and transmit light pulses in a fashion to engage in bidirectional optical half-duplex communication. The microcontroller 1410 may be comprised of any suitable controlling device, such as a logic circuit, a microprocessor, a combination of these elements, and the like. The microcontroller 1410 may have an internal clock oscillator as the time base for all operations. Alternatively, a crystal and associated circuitry may be utilized for a timing base. It may also have internal memory, which may store programming for the module The LED 1420 is a current-driven device whose brightness is proportional to its forward current. Forward current can be controlled either by applying a voltage source and using a ballast resistor or, preferably, by regulating LED current with a constant-current source, such as an LED driver 1415. The LED driver 1415 supplies a correct amount of current to drive the LED 1420. While a separate LED driver 1415 is shown, the LED driver 1415 could optionally be included or integrated into the microcontroller 1410. The LED driver 1415 eliminates changes in current due to variations in forward voltage, which translates into a constant LED brightness. Optionally, the LED driver 1415 may enable Pulse Wave Modulation (PWM) dimming, which entails applying full current to the LED at a reduced duty cycle and at a high enough frequency (e.g., >100 Hz) to avoid pulsing that is visible to the human eye. In some embodiments, the LED driver 1415 may be comprised of one or more pins on the microcontroller 1410 with a current limiting resistor. A switched current source or current sink may also be used to drive the LED 1420.

In operation the programming module communicates a determined sequence of light pulses, according to a determined protocol, to a synthetic barcode module, for purposes of initiating programming mode. After initiation, the programming module may communicate programming instructions to the synthetic barcode module.

Figure 15:
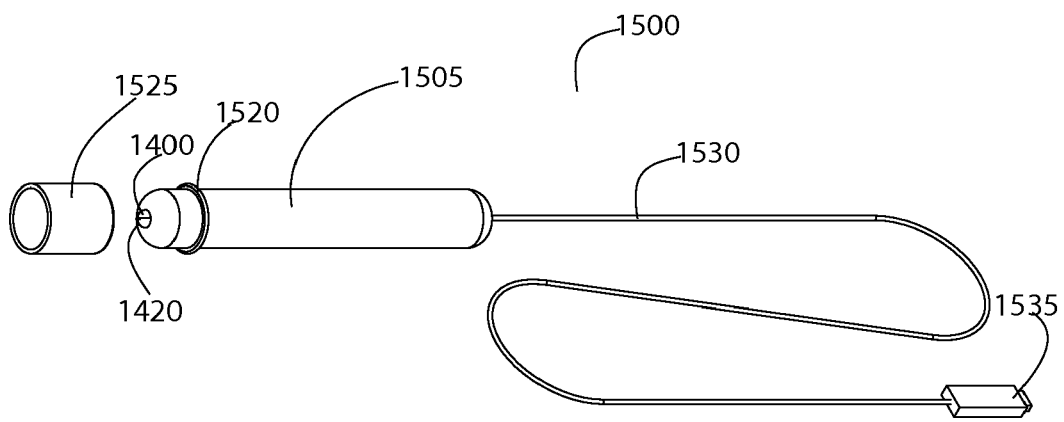
FIG. 15 provides a diagram that conceptually illustrates components of an exemplary programming device according to principles of the invention.

Referring now to FIG. 15, an exemplary programming device 1500 that contains the programming module described above with reference to FIG. 14 is conceptually shown. The device includes a housing 1505, an LED 1420 and photoreceiver 1400, a shroud 1525 configured to provide an optical communication path between the programming device and the LED emitter/receiver of a synthetic barcode module. The shroud 1525 comprises a sleeve that fits over the free end of the programming device 1500 and shields out ambient light. A retaining ring 1520 may be provided for snap-fit engagement of the shroud 1525. Alternatively, the shroud 1525 may be threaded, attached using other attachments or integrally formed. A cord 1530 and interface adapter 1535, such as a USB plug, an RJ45 plug or some other plug or jack, are provided to allow the programming device to communicatively connect to a compatible computing device, such as a computing device in a patient's room or on a medical cart.

Figure 12:
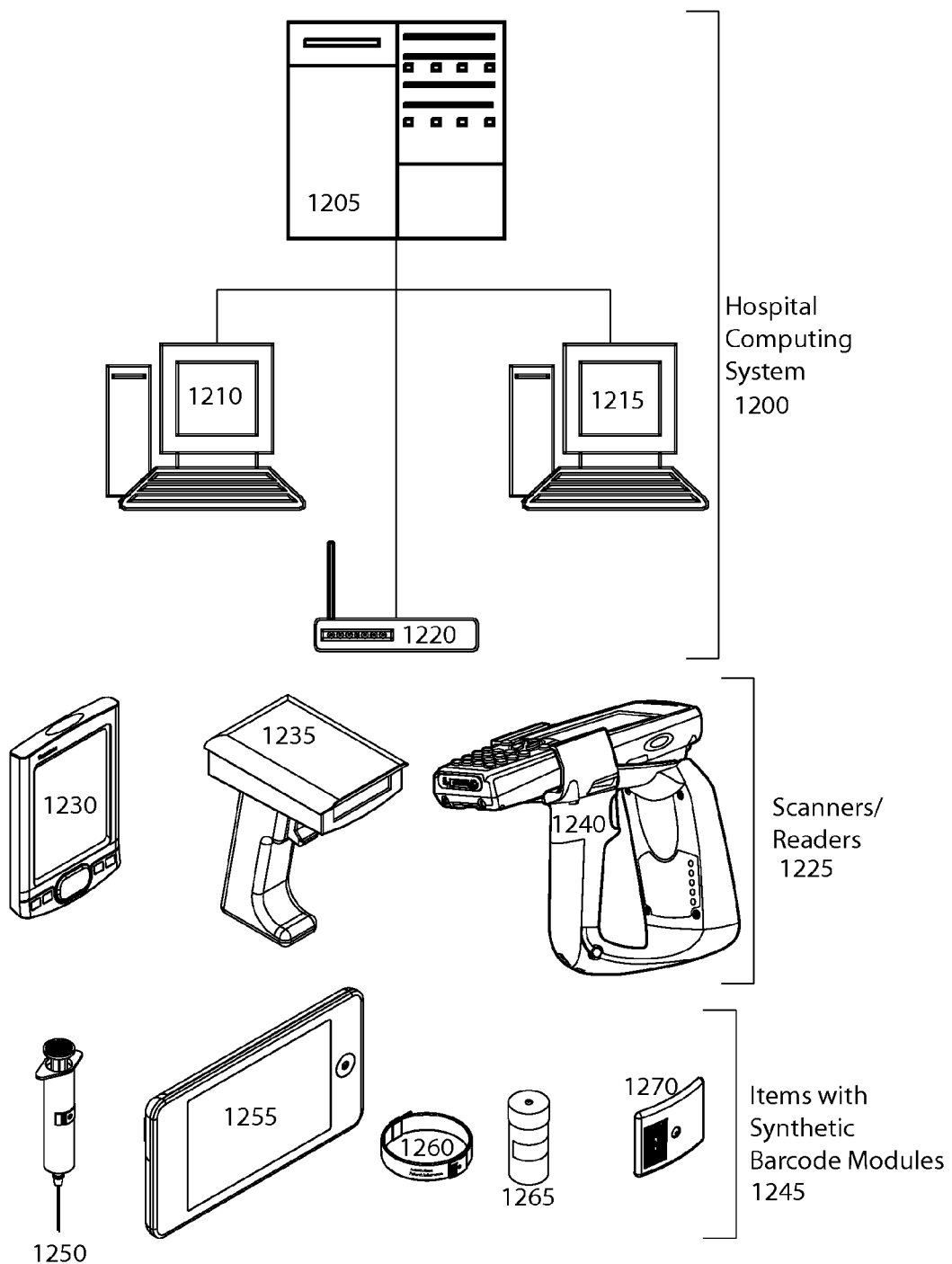
FIG. 12 provides a high level block diagram that conceptually illustrates components and relationships for an exemplary synthetic barcode and RFID system according to principles of the invention.

Referring now to FIG. 12, a high-level block diagram of a system 1200 in accordance with an exemplary implementation of the invention is shown. An enterprise computer 1205 hosts software for managing patient related data and enabling such data to be communicated to various computer stations 1210, 1215 for further input, updates and the like. While FIG. 12 shows two computer stations 1210, 1215, it is understood that the enterprise may include any number of computing stations, and that the invention does not require an enterprise computer 1205. The invention is in not limited to the exemplary networked system shown in FIG. 1.

The computer stations 1210, 1215 are configured for managing patient related data. A computer station accessible by a medical professional may be used to access patient records and prescribe drugs and treatment. A computer station accessible by a pharmacist may be used to manage fulfillment of prescriptions. Other computer stations may be available as necessary or desired.

Data may be encoded into synthetic barcode modules 1270 in program mode (as described above) using any compatible communication means, such as bidirectional half-duplex optical communication as described above, RF communication or a serial port. The data may be communicated to synthetic barcode modules via a wired or wireless router 1220, a handheld computing device 1230, or some other device configured for compatible bidirectional communication with the module. By way of example and not limitation, a computing device 1230 equipped with a means for Infrared Data Association (IrDA) or other compatible optical or RF wireless communication means may be utilized. That computing device may connect to the network or a computer on the network using any compatible network communication technology. For example, the device 1230 may be a handheld computer equipped with optical communication (e.g., IrDA) means and also equipped with RF communication (e.g., 802.11X, Bluetooth, etc. . . . ) means.

Various scanners and readers 1225 may be provided to obtain data from interrogated synthetic barcode modules and item equipped with such modules 1245. Such scanners and readers 1225 may include, for example, barcode scanners 1235, RFID readers 1240 and compatibly equipped computing devices 1230.

The scanners and readers may be configured to communicate scanned data to the system via a wireless communication system, either using an existing 802.11 network or using a dedicated wireless installation. Alternatively, the scanners and readers may intermittently link (e.g., be placed in a "cradle") to transfer information via cable to the hospital network. Still another option is to have scanners and readers connected via network cable to the hospital network.

Various articles 1245 may be equipped with synthetic barcode modules. For example, a syringe 1250, computing device 1255, wearable item 1260, medicine container 1265, may each be equipped with a synthetic barcode module 1270.

The computers described above (e.g., enterprise computer 1205, and computing stations 1210, 1215) may be comprised of commercially available computers, hardware and operating systems. Indeed, the aforementioned computing devices are intended to represent a broad category of computer systems capable of functioning in accordance with the present invention. Of course, the computing devices may include various components, peripherals and software applications provided they are compatible and capable of performing functions in accordance with the present invention. The computing devices also include information, documents, data and files needed to provide functionally and enable performance of methodologies in accordance with an exemplary embodiment of the invention. For example, the enterprise computer 1205 may include application software that manages one or more databases of patient data.

A firewall may be located between computers to protect against corruption, loss, or misuse of data. The firewall may limit access and prevent corruption of sensitive data. Thus, a computing station 1210, 1215 may be configured/authorized to access and receive only data that is necessary for the legitimate functions of the computing station. The firewall may be comprised of any hardware and/or software suitably configured to provide limited or restricted access to a computer. The firewall may be integrated within the computer or comprise another system component, or may reside as a standalone component.

Figure 13:
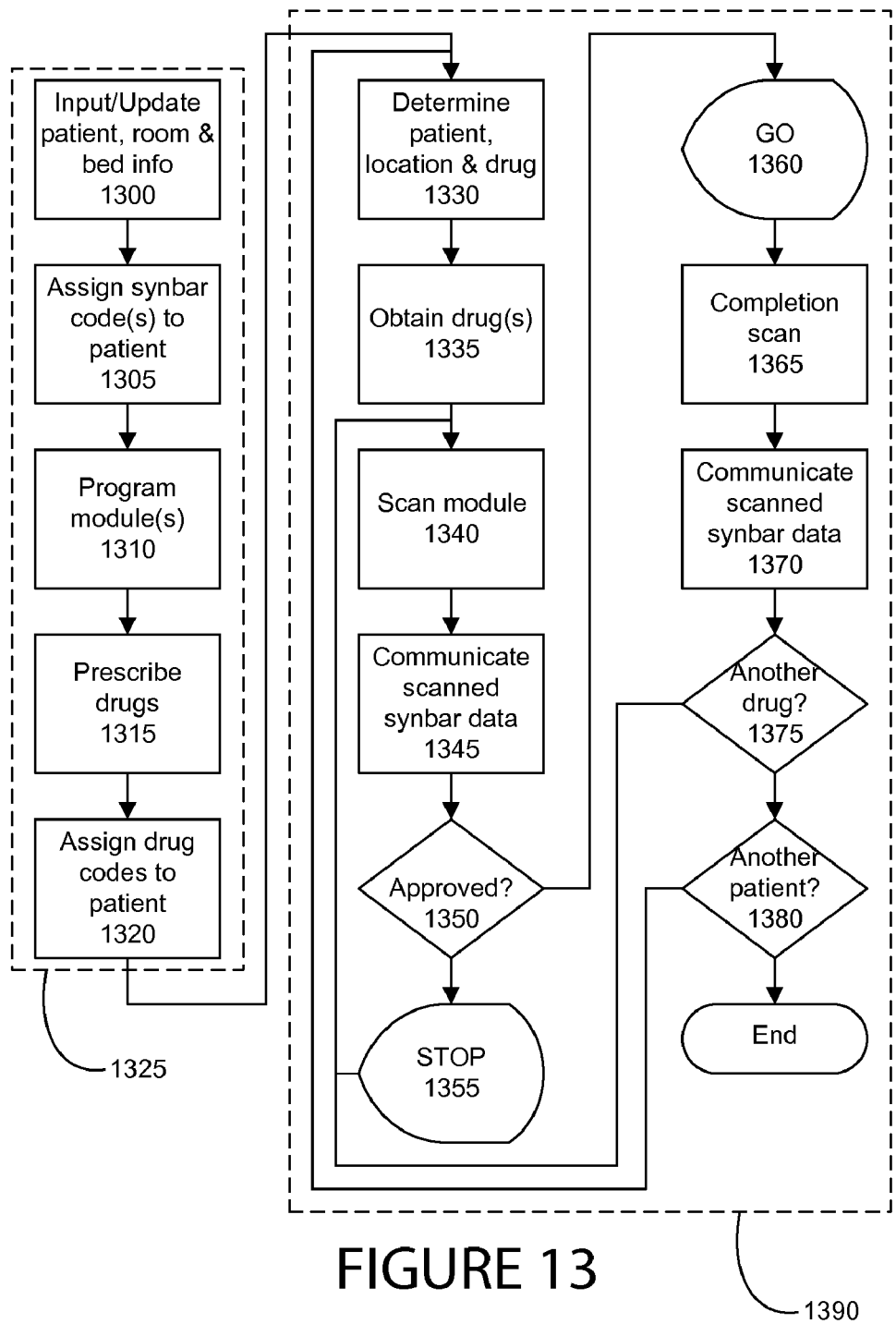
FIG. 13 provides a high level flowchart of steps of an exemplary method of utilization of a synthetic barcode and RFID system according to principles of the invention.

Referring now to FIG. 13, a high level flowchart of steps of an exemplary method of utilization of a synthetic barcode and RFID system for patient management according to principles of the invention is provided. Initially, patient information is input and/or updated in a computer of the system, as in step 1300. The information may include personal information (e.g., sex, weight, birth date/age, social security number, address, person to contact in the event of emergency, DNR directives), medical condition information, medical history information, allergy information, prescription information, information regarding scheduled treatments, and information regarding a room and bed assigned to the patient. Such information is referred to herein as "patient information." Synthetic barcode data ("synbar codes") may be associated with some or all of the patient information, as in step 1305. Next, synthetic barcode modules for a patient are programmed with the appropriate synbar codes, as in step 1310. For example, a wearable module (e.g., a bracelet mounted module) and a bedside module (e.g., a module on a patient chart or computing device located in the patient's room) are programmed with the appropriate synbar codes. Subsequently, drugs may be prescribed by a physician, as in step 1315. The prescribed drugs may be entered into the system by a physician, nurse or assistant at a computing station or using a computing device. Upon entry, the system associates drug codes to the patient, as in step 1320. The drug codes include the type of drug, the dose, frequency and any special instructions. The system will manage the schedule for administering prescribed drugs. Steps 1300 through 1320 comprise input and programming steps.

After input and programming has been completed, the system helps manage the administering of drugs. When a drug should be administered, the system notifies medical personnel of the patient, location, drug and dose, as in step 1330. The system may provide instructions and printed or electronic authorization for assigned medical personnel to obtain the drug, as in step 1335. If more than one drug should be administered to a patient at the same time, then the medical personnel will be instructed and authorized to procure all such drugs. Next the drug, which will be in a container or package that includes a synthetic barcode module, will be scanned, as in step 1340. When a barcode scanner interrogates the synthetic barcode module, the module recognizes the barcode scanner and emits optical output that emulates light reflected from a scanned barcode. Data corresponding to the scanned light will be communicated from the barcode scanner to a computer in the system. Likewise, the module worn by the patient is scanned. Additionally, the bedside module may be scanned. Thus, the light received by the barcode scanner and interpreted by the system as the code associated with a particular scanned drug, may be associated with the patient and with the patient's room and bed. The medical personnel administering the drug may also have a synthetic barcode module (e.g., on an ID card or a wearable item), which may also be scanned to track who administered the drug. A check may be performed to confirm that the drug, patient, room and bed are correct, as in step 1350. The check entails communicating the scanned data to a computer in the system (e.g., a bedside computing device), whereupon the scanned data may be compared with the synbar codes associated with data stored in the system. If all is correct, processing proceeds at step 1360. If incorrect or if a conflict is found (e.g., an allergy), the medical personnel is notified of the mismatch, or denied authorization to proceed, as in step 1355, and control passes to step 1330. The notification may be electronic, audio and/or visual. After the drug has been administered, a completion scan may be performed, as in step 1365. The completion scan (e.g., a scan of the modules on the patient and drug container/packaging, after administration) enables confirmation that, contemporaneously, the approved drug was administered to the approved patient in the approved room. The scanned synbar data is then communicated to the system, as in step 1370. An alert notification may be provided to assigned medical personnel for any failure to provide a completion scan within a determined amount of time after the scan in step 1340. This may indicate that the drug was procured but never administered to the patient. The scanning, approval and completion scanning steps (i.e., steps 1340 through 1370) are performed for each drug being administered, according to step 1375, and for each patient being treated, as in step 1380. Steps 1330 through 1380 comprise administration steps.

Advantageously, the administration steps provide several safety checks. The steps help ensure that the prescribed drug (i.e., drug and dose) is procured for the correct patient at a scheduled time. The steps also help ensure that the drug is administered to the correct patient in the correct room. The steps also help confirm that no allergies to the drug are indicated for the patient. Additionally, the system may check the dose and type of drug, against preapproved drugs and dosages for the sex, age and weight of the patient. The steps also help confirm when the drug has been administered.

Another advantage of the invention is that the synthetic barcode module may contain and communicate a wide range of data. Various sets of data may be stored and communicated sequentially. By way of example and not limitation, a synthetic barcode module worn by a person may communicate an id for that person as well as other information about that person. Such other information may include a description of the person (e.g., sex, height, weight, hair, eyes, age). Thus a person equipped with a compatible reader may verify that the person using the module fits the description. In the case of a patient, the other information may also include medical information, such as conditions, prescriptions, allergies, and special instructions. The information may also include a security question and answer. Thus, an interrogating person may ask the wearer of the synthetic module to state the wearer's zip code, last 4 digits of the wearer's social security number, mother's maiden name or some other corroborating information.

Versatility is another advantage. Where the synthetic barcode modules include an RFID circuit, the encoded data may be scanned or read by either a barcode scanner or RFID reader or by both. Thus, the invention is adaptable to environments equipped with RFID readers as well as those equipped with barcode scanners. Additionally, in facilities with RFID readers and/or optical communication devices are positioned at known locations, the location of articles and persons equipped with a synthetic barcode module may be tracked by interrogating the RFID circuit and/or interrogating the synthetic barcode module as the article moves within range of the RF and/or optical reader.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A programmable synthetic barcode module comprising:
   a light management module that produces output signals corresponding to received light pulses, emits light pulses that emulate light reflected from a scanned barcode in scan mode, and emits light pulses that enable optical bidirectional communication in programming mode, said light management module comprising an LED operating as both an optical receiver and an optical emitter, wherein the LED receives light pulses, produces output signals corresponding to the received light pulses, and emits light pulses; and a controller module that receives and stores at least one code corresponding to at least one data field, receives said output signals corresponding to received light pulses, determines if the received light pulses correspond to scan mode or programming mode, and outputs driver signals to cause the light management module to emit the light pulses that emulate light reflected from a scanned barcode to communicate the at least one code optically in scan mode, and to emit light pulses that enable optical bidirectional half-duplex communication in programming mode.

2. A programmable synthetic barcode module according to claim 1, wherein said controller module determines if the received light pulses correspond to scan mode or programming mode by checking stimulus timing.

3. A programmable synthetic barcode module according to claim 2, wherein said controller module determines if the received light pulses correspond to scan mode or programming mode by checking stimulus timing by determining if the timing of received light pulses corresponds to a barcode scanner.

4. A programmable synthetic barcode module according to claim 2, wherein said controller module determines if the received light pulses correspond to scan mode or programming mode by checking stimulus timing by determining if the timing of received light pulses corresponds to a programming unit.

5. A programmable synthetic barcode module according to claim 2, further comprising an active programmable RFID circuit operably coupled to said controller module, said RFID circuit communicating radio frequency signals corresponding to the at least one code stored by the controller module when the active programmable RFID circuit is interrogated by an RFID reader.

6. A programmable synthetic barcode module according to claim 2, further comprising an infrared emitter module, said infrared emitter module periodically emitting infrared optical signals corresponding to the at least one code stored by the controller.

7. A programmable synthetic barcode module according to claim 2, further comprising
an motion sensor operably coupled to the controller module, said motion sensor producing acceleration signals when the programmable synthetic barcode module is moved, and
an infrared emitter module operably coupled to said controller module, said infrared emitter module periodically emitting infrared optical signals corresponding to the at least one code stored by the controller module when the motion sensor produces acceleration signals.

8. A programmable synthetic barcode module according to claim 2, further comprising an CCD-readable display and a display controller, the CCD-readable display being operably coupled to the display controller and the display controller being operably coupled to the controller module, said CCD-readable display displaying indicia corresponding to the at least one code stored by the controller.

9. A programmable synthetic barcode module according to claim 8, wherein the CCD-readable display comprises an active-matrix electrophoretic display.

10. An optical management system for an article, said system comprising:
a first synthetic barcode module associated with a first article; and
a scanner having an emitter configured to emit light, a sensor configured for receiving light and a scanner communications interface configured for communicating scan signals corresponding to the received light; and
a computer system having a processor, a data storage subsystem, a data communication subsystem, and a system communications interface, said computer system
communicating a first code corresponding to a first data field to the first synthetic barcode module, and
storing the first data field on the data storage subsystem, and
receiving scan signals from a scanner via the system communications interface, and
determining if the received scan signals indicate that the scanner scanned the first synthetic barcode module; and
the first synthetic barcode module being programmable and including:
a light management module that produces output signals corresponding to received light pulses, emits light pulses that emulate light reflected from a scanned barcode in scan mode, and emits light pulses that enable optical bidirectional communication in programming mode, said light management module comprising an LED operating as both an optical receiver and an optical emitter, wherein the LED receives light pulses, produces output signals corresponding to the received light pulses, and emits light pulses; and
a controller module that receives and stores at least one code corresponding to at least one data field, receives said output signals corresponding to received light pulses, determines if the received light pulses correspond to scan mode or programming mode, and outputs driver signals to cause the light management module to emit the light pulses that emulate light reflected from a scanned barcode to communicate the at least one code optically in scan mode, and to emit light pulses that enable optical bidirectional half-duplex communication in programming mode.

11. An optical management system for an article according to claim 10, the first synthetic barcode module further comprising an RFID circuit operably coupled to said controller module and configured to communicate radio frequency signals corresponding to the code stored by the controller module when the RFID circuit is interrogated by an RFID reader.

12. An optical management system for articles according to claim 11, wherein the light management module further comprises a signal conditioning circuit operably coupled to the LED and the controller, said signal conditioning circuit improving a signal to noise ratio and supplying a logic level signal to the controller module corresponding to light emitted from the scanner and received by the LED.

13. An optical management system for articles according to claim 12, wherein the light management module further comprises an LED driver configured to regulate electrical power supplied to the LED.

14. An optical management system for articles according to claim 10, wherein said system communications interface comprises a bi-directional optical communications interface optically communicating to the first synthetic barcode module optical signals representing the first code corresponding to the first data field.

15. An optical management system for articles according to claim 14, wherein the first synthetic barcode module discriminates light pulses received from a scanner from light pulses received from the bi-directional optical communications interface.

16. An optical management system for articles according to claim 10, wherein the first article is an article from the group consisting of a wearable item, a container for a drug, a patient chart, a computing device and a patient's bed.

17. An optical management method for articles comprising steps of:
   providing a first programmable synthetic barcode module, said programmable synthetic barcode module including:
      a light management module that produces output signals corresponding to received light pulses, emits light pulses that emulate light reflected from a scanned barcode in scan mode, and emits light pulses that enable optical bidirectional communication in programming mode, said light management module comprising an LED operating as both an optical receiver and an optical emitter, wherein the LED receives light pulses, produces output signals corresponding to the received light pulses, and emits light pulses; and
      a controller module that receives and stores at least one code corresponding to at least one data field, receives said output signals corresponding to received light pulses, determines if the received light pulses correspond to scan mode or programming mode, and outputs driver signals to cause the light management module to emit the light pulses that emulate light reflected from a scanned barcode to communicate the at least one code optically in scan mode, and to emit light pulses that enable optical bidirectional half-duplex communication in programming mode;
   receiving light from an external light source using a first LED;
   generating a signal from the light received from the external light source using the first LED;
   conditioning the signal from the light received from the external light source using the first LED to improve signal to noise ratio;
   determining if the signal corresponds to light received from a compatible device from the group consisting of a barcode scanner and an optical programming device;
   if the signal corresponds to light received from a compatible device from the group consisting of a barcode scanner and a optical programming device, determining whether the signal corresponds to light received from a barcode scanner or an optical programming device based upon stimulus timing;
   if the signal corresponds to light received from a barcode scanner, determining output optical signals to emit from the first LED and emitting the output optical signals from the first LED; and
   if the signal corresponds to light received from an optical programming device, engaging in bidirectional optical half-duplex communication between the optical programming device and the first programmable synthetic barcode module to receive programming data on the first programmable synthetic barcode module.

18. An optical management method for articles according to claim 17, said step of determining whether the signal corresponds to light received from a barcode scanner or from an optical programming device based upon stimulus timing comprising determining if the signal repeats at a fixed time interval.

19. An optical management method for articles according to claim 17, said step of determining if the signal corresponds to light received from a compatible device from the group consisting of a barcode scanner and an optical programming device by determining whether the signal amplitude equals or exceeds a determined amplitude and signal rise time is no greater than a determined rise time, said determined rise time and said determined amplitude being characteristic of a light pulse from the compatible device.

* * * * *